US009908265B2

(12) United States Patent
Ikawa et al.

(10) Patent No.: US 9,908,265 B2
(45) Date of Patent: Mar. 6, 2018

(54) METHOD OF MANUFACTURING MOLD, AND MOLDED ARTICLE HAVING FINE RELIEF STRUCTURE ON SURFACE AND METHOD OF MANUFACTURING THE SAME

(71) Applicants: MITSUBISHI RAYON CO., LTD., Tokyo (JP); KANAGAWA ACADEMY OF SCIENCE AND TECHNOLOGY, Kawasaki-shi, Kanagawa (JP)

(72) Inventors: Masashi Ikawa, Otake (JP); Eiko Okamoto, Otake (JP); Hiroshi Onomoto, Otake (JP); Jitsuo Hirohata, Otake (JP); Yuji Matsubara, Otake (JP); Hideki Masuda, Tokyo (JP)

(73) Assignees: MITSUBISHI CHEMICAL CORPORATION, Tokyo (JP); KANAGAWA INSTITUTE OF INDUSTRIAL SCIENCE AND TECHNOLOGY, Tokyo (JP)

( * ) Notice: Subject to any disclaimer, the term of this patent is extended or adjusted under 35 U.S.C. 154(b) by 208 days.

(21) Appl. No.: 14/419,293

(22) PCT Filed: Aug. 6, 2013

(86) PCT No.: PCT/JP2013/071223
§ 371 (c)(1),
(2) Date: Feb. 3, 2015

(87) PCT Pub. No.: WO2014/024868
PCT Pub. Date: Feb. 13, 2014

(65) Prior Publication Data
US 2015/0290844 A1    Oct. 15, 2015

(30) Foreign Application Priority Data

Aug. 6, 2012  (JP) .................................. 2012-174349
Aug. 6, 2012  (JP) .................................. 2012-174350

(51) Int. Cl.
*C25D 11/04*    (2006.01)
*C25D 11/10*    (2006.01)
(Continued)

(52) U.S. Cl.
CPC ............ *B29C 33/3842* (2013.01); *C25D 1/10* (2013.01); *C25D 5/48* (2013.01); *C25D 7/00* (2013.01);
(Continued)

(58) Field of Classification Search
CPC .................................................. C25D 11/024
See application file for complete search history.

(56) References Cited

U.S. PATENT DOCUMENTS 8,790,503 B2 *  7/2014  Ihara ...................... C25D 11/04
                                                             205/223
8,999,133 B2 *  4/2015  Isurugi .................. B29C 33/424
                                                             205/108
(Continued)

FOREIGN PATENT DOCUMENTS

JP    2003-171793 A    6/2003
JP    2010-253820 A    11/2010
(Continued)

OTHER PUBLICATIONS

International Search Report dated Nov. 19, 2013, issued in International Application PCT/JP2013/071223.
Written Opinion issued in International Application PCT/JP2013/071223.
Office Action dated Mar. 10, 2016, for Korean Application No. 10-2015-7002887.

*Primary Examiner* — Brian W Cohen
(74) *Attorney, Agent, or Firm* — Fitch, Even, Tabin & Flannery LLP

(57) ABSTRACT

The present invention relates to a method of manufacturing a mold having an oxide film with a plurality of pores formed on a surface of an aluminum substrate, the method including (a) a process of applying a voltage to a machined aluminum (Continued)

substrate and anodizing a surface of the aluminum substrate to form an oxide film; and (b) a process of removing at least a part of the oxide film formed in the process (a), wherein a voltage ($V_a$[V]) immediately before the process (a) is terminated and a time ($t_a$[sec]) required to reach the voltage ($V_a$[V]) after starting the application of voltage satisfy the following Equation (i) in the process (a).

$$0.010 < V_a/t_a < 14 \tag{i}$$

14 Claims, 3 Drawing Sheets

(51) Int. Cl.
| | |
|---|---|
| C25D 5/18 | (2006.01) |
| C25D 21/12 | (2006.01) |
| B29C 33/38 | (2006.01) |
| C25D 1/10 | (2006.01) |
| C25D 5/48 | (2006.01) |
| C25D 7/00 | (2006.01) |
| C25D 9/06 | (2006.01) |
| C25D 11/02 | (2006.01) |
| C25D 11/12 | (2006.01) |
| C25D 11/24 | (2006.01) |

(52) U.S. Cl.
CPC .............. *C25D 9/06* (2013.01); *C25D 11/024* (2013.01); *C25D 11/045* (2013.01); *C25D 11/10* (2013.01); *C25D 11/12* (2013.01); *C25D 11/24* (2013.01); *C25D 21/12* (2013.01); *B29K 2905/02* (2013.01)

(56) References Cited

U.S. PATENT DOCUMENTS

| | | | |
|---|---|---|---|
| 2003/0141193 A1* | 7/2003 | Hossick-Schott | C25D 5/18 205/104 |
| 2005/0150771 A1* | 7/2005 | Kock | C25D 11/04 205/172 |
| 2006/0037477 A1* | 2/2006 | Lopez | B01D 67/0065 96/11 |
| 2007/0289945 A1* | 12/2007 | Hatanaka | C25D 11/12 216/83 |
| 2009/0194914 A1 | 8/2009 | Uozu et al. | |
| 2012/0058216 A1 | 3/2012 | Ihara | |
| 2012/0213971 A1* | 8/2012 | Ihara | C25D 11/12 428/156 |
| 2012/0318674 A1* | 12/2012 | Wada | C25D 11/04 205/108 |
| 2013/0153537 A1 | 6/2013 | Isurugi et al. | |
| 2013/0319869 A1* | 12/2013 | Turner | C25D 11/02 205/81 |

FOREIGN PATENT DOCUMENTS

| | | | | |
|---|---|---|---|---|
| JP | 2010-253823 | A | 11/2010 | |
| JP | 2012-140001 | A | 7/2012 | |
| KR | 1995-0012427 | B1 | 10/1995 | |
| KR | 2012-0027551 | A | 3/2012 | |
| WO | 2010/128662 | A1 | 11/2010 | |
| WO | 2011/118583 | A1 | 9/2011 | |
| WO | WO 2011136229 | A1 * | 11/2011 | ............ C25D 11/04 |
| WO | 2012/029570 | A1 | 3/2012 | |
| WO | WO 2012029570 | A1 * | 3/2012 | ........... B29C 33/424 |

* cited by examiner

METHOD OF MANUFACTURING MOLD, AND MOLDED ARTICLE HAVING FINE RELIEF STRUCTURE ON SURFACE AND METHOD OF MANUFACTURING THE SAME

CROSS-REFERENCE TO RELATED APPLICATIONS

This Application is a U.S. National Stage Application filed under 35 U.S.C. § 371 of International Application PCT/JP2013/071223, filed Aug. 6, 2013, designating the United States, which claims priority from Japanese Patent Application 2012-174349, filed in the Japan Patent Office on Aug. 6, 2012, and Japanese Patent Application No. 2012-174350, filed in the Japan Patent Office on Aug. 6, 2012, the complete disclosures of which are hereby incorporated herein by reference in their entirety for all purposes.

TECHNICAL FIELD

The present invention relates to a method of manufacturing a mold having a fine relief structure composed of a plurality of pores on a surface, and a molded article which is manufactured using the mold and has a fine relief structure on the surface and a method of manufacturing the same.

BACKGROUND ART

In recent years, an advance in fine processing technology has made it possible to impart a nanoscale fine relief structure on the surface of a molded article. The industrial application of the nanoscale fine relief structure has been actively attempted since the nanoscale fine relief structure exerts the function derived from its structure such as an antireflection function called the moth-eye effect and a water repellent function called the lotus effect.

There are a variety of technologies to impart the fine relief structure onto the surface of a molded article. Among these, the method to transfer the fine relief structure formed on the surface of a mold onto the surface of the body of molded article is suitable for the industrial production since the fine relief structure can be imparted onto the surface of the molded article by simple and fewer processes. In recent years, a method utilizing an oxide film with a plurality of pores (anodic porous alumina) which is obtained by anodizing an aluminum substrate has attracted attention as the method to simply manufacture a large-area mold having a fine relief structure on the surface. The interval (pitch) between pores increases in proportion to the applied voltage in the oxide film formed by anodization. The method is suitable as the method of manufacturing a mold from the viewpoint that the interval between pores can be relatively easily controlled as well.

In the case of manufacturing a mold utilizing the anodization, a method is suitable in which the anodization is carried out by two separated stages in order to form pores having both a suitable depth and regular arrangement on the mold. In other words, pores suitable for a mold are formed by sequentially performing the following process (1) to process (3).

Process (1): a process of anodizing the surface of an aluminum substrate and regularly arranging the pores regardless of the depth of the pores.

Process (2): a process of removing a part or all of the oxide film formed in process (1).

Process (3): a process of anodizing the aluminum substrate again to form pores having an arbitrary depth while maintaining the regular arrangement after the process (2).

There is a case in which the aluminum substrate has a mirror finished surface by the machining such as cutting or mechanical polishing.

However, the white streak considered to be derived from cutting streaks or polishing streaks, which are formed in machining of the aluminum substrate, appears when the machined aluminum substrate is anodized at a voltage of 40 V or more and thus the surface of the resulting mold is clouded in some cases. The surface of the mold tends to be clouded particularly in the case of anodizing the machined aluminum substrate at a voltage of 60 V or more in order to form an oxide film having a great interval between pores.

The white streak is also transferred onto the surface of the body of molded article in a case in which the fine relief structure is transferred onto the surface of the body of molded article using a clouded mold. The haze of the molded article having the white streak transferred onto the surface is likely to increase and thus the reflectance also increases.

As the method of manufacturing a mold which is hardly clouded even when the machined aluminum substrate is anodized, for example, a method is disclosed in Patent Document 1 in which the aluminum substrate is subjected to the cathodic electrolysis, electrolytic polishing, or etching prior to the first stage anodization process.

CITATION LIST

Patent Document

Patent Document 1: WO 2010/128662 A

SUMMARY OF THE INVENTION

Problem to be Solved by the Invention

However, in the case of the method described in Patent Document 1, it is required to perform the cathodic electrolysis, electrolytic polishing, or etching prior to the first stage anodization process, and thus the number of processes increases, which is complicated.

The invention has been achieved in view of the above circumstances, and an object thereof is to provide a method which can simply manufacture a mold having a surface with suppressed cloudiness even in the case of manufacturing a mold having a relatively great interval between pores, and a molded article having a low haze and a fine relief structure on the surface and a method of manufacturing the same.

Means for Solving Problem

As the result of intensive investigations, the present inventors have found out that a rapid instant increase in the applied voltage and the current (jump in voltage and current) is likely to occur immediately after the voltage is applied, and this jump in voltage and/or current is associated with the cloudiness of the mold surface.

Hence, it has been found out that it is possible to suppress the cloudiness of the surface of the resulting mold even when the machined aluminum substrate is anodized by suppressing an increase in voltage and/or current, that is, a jump in voltage and/or current immediately after the application of voltage in the first stage anodization process, thereby completing the invention.

In other words, the invention has the following aspects.

<1> A method of manufacturing a mold having an oxide film with a plurality of pores formed on a surface of an aluminum substrate, the method including:

(a) a process of applying a voltage to a machined aluminum substrate and anodizing a surface of the aluminum substrate to form an oxide film; and (b) a process of removing at least a part of the oxide film formed in the process (a), in which a voltage ($V_a$ [V]) immediately before the process (a) is terminated and a time ($t_a$ [sec]) required to reach the voltage ($V_a$ [V]) after starting the application of voltage satisfy the following Equation (i) in the process (a).

$$0.010 < V_a/t_a < 14 \qquad (i)$$

<2> The method of manufacturing a mold according to <1>, in which a current density immediately after the application of voltage is 20 mA/cm$^2$ or less in the process (a).

<3> The method of manufacturing a mold according to <2>, in which a current density immediately after the application of voltage is 10 mA/cm$^2$ or less in the process (a).

<4> The method of manufacturing a mold according to any one of <1> to <3>, in which the anodization is finally performed at a higher voltage than an initial anodization and 60 V or more in the process (a).

<5> The method of manufacturing a mold according to any one of <1> to <4>, in which an electrolytic solution used in the anodization of the process (a) contains an organic acid.

<6> The method of manufacturing a mold according to <5>, in which a main component of the electrolytic solution is oxalic acid.

<7> The method of manufacturing a mold according to <1>, in which the initial anodization is performed at 50 V or less and the anodization is finally performed at a higher voltage than the initial anodization in the process (a).

<8> The method of manufacturing a mold according to <7>, in which the anodization is finally performed at 60 V or more in the process (a).

<9> The method of manufacturing a mold according to any one of <1> to <8>, in which the voltage is raised in a stepwise manner from the initial anodization to the final anodization in the process (a).

<10> The method of manufacturing a mold according to any one of <7> to <9>, in which an electrolytic solution used in the anodization of the process (a) contains an organic acid.

<11> The method of manufacturing a mold according to <10>, in which a main component of the electrolytic solution is oxalic acid.

<12> The method of manufacturing a mold according to any of <1> to <11>, the method further including:

(c) a process of anodizing the aluminum substrate to form an oxide film with a plurality of pores after the process (b) or the following process (d);

(d) a process of removing a part of the oxide film formed in the process (c); and (e) a process of alternately repeating the process (c) and the process (d), in which a voltage ($V_c$ [V]) immediately before the process (c) is terminated and a time ($t_c$ [sec]) required to reach the voltage ($V_c$ [V]) after applying a voltage satisfy the following Equation (ii) in the process (c).

$$2 < V_c/t_c < 14 \qquad (ii)$$

<13> The method of manufacturing a mold according to <12>, in which a current density immediately after the application of voltage is 20 mA/cm$^2$ or less in the process (c).

<14> The method of manufacturing a mold according to <13>, in which a current density immediately after the application of voltage is 10 mA/cm$^2$ or less in the process (c).

<15> The method of manufacturing a mold according to any one of <12> to <14>, in which the initial anodization is performed at 40 V or less in the process (a) and an electrolytic solution used in the anodization of the process (c) contains an organic acid.

<16> The method of manufacturing a mold according to <15>, in which a main component of the electrolytic solution used in the anodization of the process (c) is oxalic acid.

<17> A method of manufacturing a molded article having a fine relief structure on the surface including:

transferring a fine relief structure composed of a plurality of pores formed on a surface of the mold obtained by the method of manufacturing a mold according to any one of <1> to <16> onto a surface of a body of molded article.

<18> A molded article having a fine relief structure by the method of manufacturing a molded article having a fine relief structure on the surface according to <17> on the surface, in which haze is 5% or less.

Effect of the Invention

According to the method of manufacturing a mold of the invention, it is possible to simply manufacture a mold having a surface with suppressed cloudiness even in the case of manufacturing a mold having a relatively great interval between pores.

In addition, according to the method of manufacturing a molded article having a fine relief structure on the surface of the invention, it is possible to manufacture a molded article having a low haze.

In addition, the molded article having a fine relief structure on the surface of the invention has a low haze.

MODE(S) FOR CARRYING OUT THE INVENTION

In the present specification, the term "pore" refers to the concave portion of the fine relief structure formed on the oxide film on the surface of the aluminum substrate.

In addition, the term "interval between pores" means the distance between the centers of the adjacent pores.

In addition, the term "protrusion" refers to the convex portion of the fine relief structure formed on the surface of the molded article.

In addition, the term "fine relief structure" means a structure having an average interval between the convex portions or concave portions of a nanoscale.

In addition, the term "(meth)acrylate" is a general term for an acrylate and a methacrylate.

In addition, the term "active energy ray" means visible light, ultraviolet light, electron beams, plasma, heat rays (infrared rays and the like) and the like.

<Method of Manufacturing Mold>

The method of manufacturing a mold of the invention is a method including the following process (a) and process (b). It is preferable that the method of manufacturing a mold further include the following process (c) to process (e).

(a) A process of applying a voltage to a machined aluminum substrate and anodizing a surface of the aluminum substrate to form an oxide film.

(b) A process of removing at least a part of the oxide film formed in the process (a).

(c) A process of anodizing the aluminum substrate to form an oxide film with a plurality of pores after the process (b) or the following process (d).

(d) A process of removing a part of the oxide film formed in the process (c).

(e) A process of alternately repeating the process (c) and the process (d).

(Process (a))

Process (a) is a first oxide film forming process in which a voltage is applied to a machined aluminum substrate and the surface of the aluminum substrate is anodized to form an oxide film.

Figure 1:
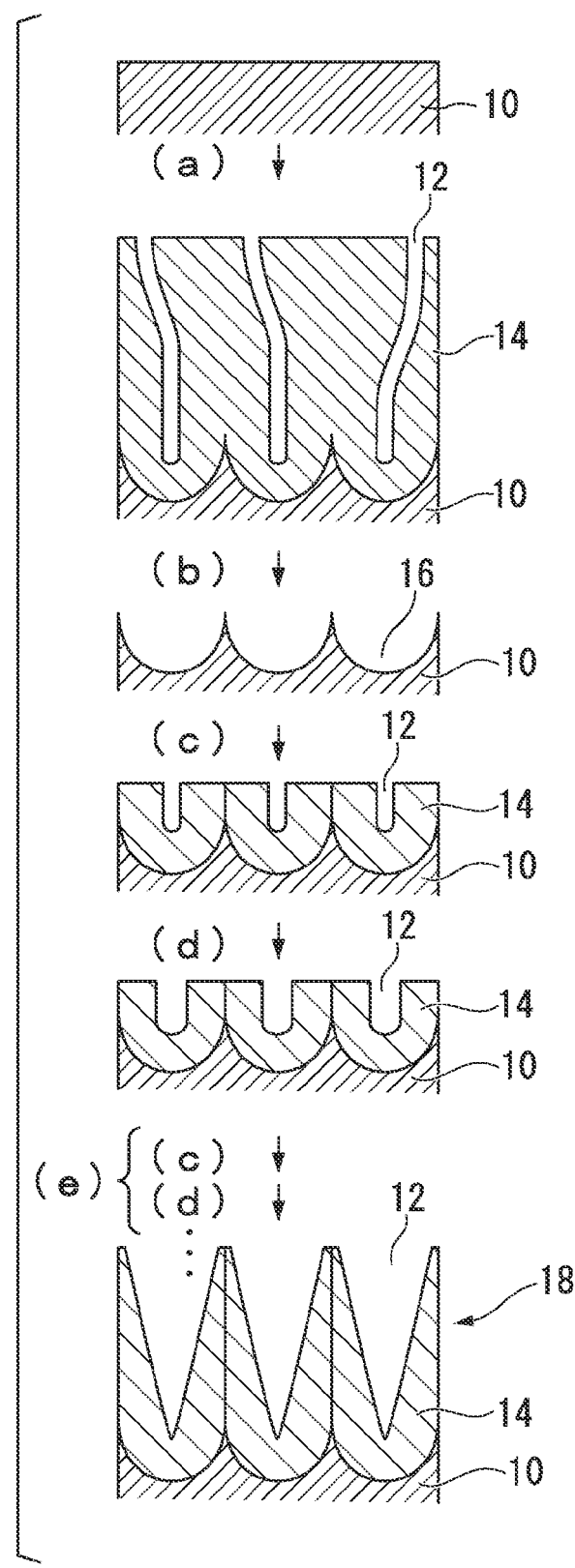
FIG. 1 is a cross-sectional diagram illustrating a manufacturing process of a mold having an anodic alumina on the surface.

For example, an oxide film 14 having a plurality of pores 12 is formed on the surface of an aluminum substrate 10 as illustrated in FIG. 1 when the process (a) is performed.

The oxide film can be formed on the part which is immersed in the electrolytic solution by immersing and anodizing a part or all of the surface of the aluminum substrate in the electrolytic solution. The position and size of the pores are ununiform and are not regular at all in the case of the oxide film formed during the initial stage of the anodization, but the regularity in arrangement of the pores is gradually improved as the oxide film becomes thicker.

The shape of the aluminum substrate is not particularly limited and may be any shape, such as a plate shape, a columnar shape, and a cylindrical shape, as long as the shape is usable as a mold.

A machined aluminum substrate is used as the aluminum substrate.

In the invention, the term "machining" means to convert the surface of the aluminum substrate to a mirror finished surface by the physical cutting or polishing but not by the electrolytic polishing. Meanwhile, the physical polishing also includes the "polishing by tape".

The purity of the aluminum substrate is preferably 98% by mass or more, more preferably 99.0% by mass or more, even more preferably 99.5% by mass or more, and most preferably 99.9% by mass or more. A relief structure having a size enough to scatter visible light is formed due to the segregation of impurities at the time of anodizing is performed or the regularity of pores obtained by the anodization deteriorates in some cases when the purity of aluminum is low.

However, it is difficult to work when aluminum is worked into a desired shape (for example, cylindrical shape) in some cases since it is too soft in the case of using high-purity aluminum. Hence, those obtained by adding magnesium to aluminum and then working into a predetermined shape may be used as the aluminum substrate. The strength of aluminum enhanced by the addition of magnesium and thus it is easy to work. However, the haze of the molded article obtained by transferring the fine relief structure of the resulting mold onto the surface of the body of molded article tends to increase as the amount of magnesium added is increased. Accordingly, the amount of magnesium added is preferably determined in consideration of the strength of aluminum and the haze of the molded article, and it is usually about from 0.1 to 2% by mass with respect to aluminum.

Examples of the electrolytic solution may include an acid aqueous solution or an alkaline aqueous solution, and an acid aqueous solution is preferable. Examples of the acid aqueous solution may include an inorganic acid (for example, sulfuric acid and phosphoric acid) and an organic acid (for example, oxalic acid, malonic acid, tartaric acid, succinic acid, malic acid, and citric acid). One kind of these acids may be used singly or two or more kinds thereof may be used in combination.

As an electrolytic solution, those containing an organic acid are preferable and those containing oxalic acid as the main component are particularly preferable. It is easy to obtain a fine relief structure having a relatively great interval of 100 nm or more between pores when the electrolytic solution contains an organic acid. It is easy to obtain a fine relief structure which has a relatively great interval of 100 nm or more between pores and relatively high regularity of pores particularly when oxalic acid is the main component of the electrolytic solution.

In the case of using oxalic acid as the electrolytic solution:

The concentration of oxalic acid is preferably 0.7 M or less. The current value is too high when the concentration of oxalic acid is more than 0.7 M, and thus the surface of the oxide film is coarse in some cases.

The temperature of the electrolytic solution is preferably 60° C. or lower and more preferably 45° C. or lower. The phenomenon, the so-called "burning" takes place when the temperature of the electrolytic solution is higher than 60° C., and thus the pores are broken or the regularity of pores is disordered due to the melting of surface in some cases.

In the case of using sulfuric acid as the electrolytic solution:

The concentration of sulfuric acid is preferably 0.7 M or less. The current value is too high when the concentration of sulfuric acid is more than 0.7 M, and thus it is not able to maintain the constant voltage in some cases.

The temperature of the electrolytic solution is preferably 30° C. or lower and more preferably 20° C. or lower. The phenomenon, the so-called "burning" takes place when the temperature of the electrolytic solution is higher than 30° C., and thus the pores are broken or the regularity of pores is disordered due to the melting of surface in some cases.

In the case of using two or more kinds in combination:

As the method of determining the composition of the electrolytic solution, a method is preferable in which first, the main acid is determined and then the kind and proportion of other acids are determined depending on the applied voltage. For example, it is preferable to determine oxalic acid which is suitably usable in the voltage region of approximately 40 V as the main acid (main component) and then to appropriately determine the kind and proportion of the acid, which is usable in the voltage region of usually from 120 to 195 V, such as phosphoric acid, malonic acid, and tartaric acid, and it is more preferable to determine oxalic acid as the main acid and phosphoric acid as another acid.

The proportion of the main acid is from 45 to 90 mol % and preferably from 50 to 75 mol % of the total acid (100 mol %). The effect of the acids other than the main acid (hereinafter, also referred to as the "other acids") is sufficiently exhibited and the current density is lower as compared to the case of the main acid only although the applied voltage is high when the proportion is within this range. In addition, the adverse effect caused by the other acids is sufficiently small such that the thickness of oxide film or the diameter of the hollow formed on the aluminum substrate by removing at least a part of the oxide film is ununiform.

The concentration of the electrolytic solution cannot be unconditionally regulated since the suitable range differs depending on the kind of acid, but an example will be mentioned for the case in which oxalic acid is the main acid and phosphoric acid is another acid.

The concentration of oxalic acid is preferably from 0.3 to 1.5 M, more preferably from 0.3 to 1.0 M, and even more preferably from 0.3 to 0.8 M. It is possible to relatively uniformly keep the diameter of the pores formed on the oxide film or the diameter of the hollow formed on the aluminum substrate at the time of anodizing is performed in a voltage region of from 70 to 130 V when the concentration of oxalic acid is within this range.

The concentration of phosphoric acid may be any concentration as long as the proportion of oxalic acid is from 45 to 90 mol % of the total acid (100 mol %). It is possible to sufficiently suppress the current density flowing at the time of anodizing when the concentration of phosphoric acid is within this range. It is effective from the viewpoint that not only the defects called the thermal runaway or the burning caused by a high current density is prevented and also an oxide film with a uniform thickness is formed when the current density is low.

In the process (a), a voltage is applied to the aluminum substrate and the anodization treatment is performed, but it has been found out that a rapid instant increase in current (jump in current) is likely to occur immediately after the application of voltage as described above. The mold surface is clouded when this jump in current occurs, and thus the haze of the molded article obtained by transferring the fine relief structure of the resulting mold onto the surface of the body of molded article further increases and the reflectance increases. A jump in current is also greater particularly in the case of applying a high voltage (for example, 60 V or more) in order to manufacture a mold having a relatively great interval between pores, and thus the cloudiness of the mold surface is remarkable.

Hence, the anodization is performed by applying a voltage to the aluminum substrate such that the voltage ($V_a$ [V]) immediately before the process (a) is terminated and the time ($t_a$ [sec]) required to reach the voltage ($V_a$ [V]) after starting the application of voltage satisfy the following Equation (i) in the process (a).

$$0.010 < V_a/t_a < 14 \tag{i}$$

It is possible to shorten the time for the process (a) when $V_a/t_a$ is more than 0.010, and thus a decrease in the productivity of mold can be suppressed. In addition, it is possible to suppress that a high voltage is applied and thus a jump in current is caused immediately after the application of voltage when $V_a/t_a$ is less than 14. Consequently, the cloudiness of the mold surface is suppressed, an increase in haze of the molded article obtained by transferring the fine relief structure of the resulting mold can be suppressed, and thus a molded article having a low reflectance is obtained.

$V_a/t_a$ is preferably more than 0.010 and less than 6 and more preferably more than 0.010 and less than 2.

The method of applying a voltage so as to satisfy Equation (i) above is not particularly limited, but examples thereof may include a method in which the anodization of the initial stage (hereinafter, also referred to as the "initial anodization") is performed at a voltage lower than the voltage immediately before the process (a) is terminated and the anodization is finally performed at a higher voltage than the initial anodization.

The voltage at the time of the initial anodization in the process (a) (hereinafter, also referred to as the "initial voltage") is preferably 50 V or less, more preferably 45 V or less, and even more preferably 40 V or less. By performing the initial anodization at a voltage of 50 V or less, it is possible to further suppress the occurrence of a jump in current immediately after the application of voltage, the white streak considered to be derived from machining is less likely to appear, and it is possible to further suppress the cloudiness of the surface of the resulting mold. The lower limit value of the initial voltage is not particularly limited but is preferably 15 V or more.

The voltage at the time of the final anodization in the process (a) (hereinafter, also referred to as the "final anodization"), that is, the voltage ($V_a$ [V]) immediately before the process (a) is terminated (hereinafter, also referred to as the "final voltage") is preferably a value higher than the initial voltage, specifically it is preferably 40 V or more, more preferably 60 V or more, and even more preferably 65 V or more. It is easy to form an oxide film having pores which have an interval of 100 nm or more and exhibit high regularity when the final anodization is performed at a voltage of 40 V or more. It is possible to form an oxide film having pores which have a relatively great interval, specifically have an interval of greater than 100 nm and exhibit high regularity particularly when the final anodization is performed at a voltage of 60 V or more. The upper limit value of the final voltage is not particularly limited but is preferably 180 V or less.

The time for final anodization, for example, the time to maintain the voltage of 60 V or more is preferably 1.5 minutes or longer and more preferably 2 minutes or longer from the viewpoint that an oxide film having a relatively great interval between pores is easily formed. The upper limit value is not particularly limited but is preferably 10 minutes or shorter from the viewpoint that a mold can be manufactured in a short period of time.

In the process (a), the voltage may be raised in a stepwise manner or continuously from the initial anodization to the final anodization in the case of performing the final anodization at a higher voltage than the initial anodization, but it is preferable to raise the voltage in a stepwise manner from the viewpoint of the easy voltage control.

In addition, in the case of raising the voltage in a stepwise manner, it is possible to perform the initial anodization at a certain voltage for a certain period of time, to raise the voltage to the final voltage, and then to perform the final anodization at a certain voltage for a certain period of time, or it is possible to have a stage to perform anodization (another anodization) at another certain voltage for another certain period of time between the initial anodization and the final anodization.

Furthermore, the voltage may be raised or dropped in a stepwise manner or continuously during the initial anodization, the final anodization, and another anodization, or the voltage may be 0 V in the middle of anodization. However, the electric field applied to the anode is eliminated when the voltage becomes 0 V in the middle of the anodization. Hence, the oxide film is partially peeled off from the aluminum substrate when the voltage is raised to create the electric field again after the voltage has become 0 V in the middle, and thus the thickness of the oxide film is ununiform in some cases. Consequently, it is preferable to perform the anodization so as not to have a voltage of 0 V in the middle.

In the case of raising the voltage in a stepwise manner, the voltage may be boosted instantaneously or gradually when boosting from an arbitrary voltage to a next voltage. Meanwhile, the same applies to the boosting speed in the case of raising the voltage continuously. However, the current flowing through the aluminum substrate instantly increases when the voltage is instantaneously boosted, and thus burning occurs in some cases. On the other hand, the working time of mold is prolonged when the boosting speed is too slow, and thus the productivity of mold is impaired or extra oxide film is formed to be thick while raising the voltage in some cases.

Meanwhile, the anodization may be performed at a constant voltage from the start to the end as long as Equation (i) above is satisfied.

In the process (a), the quantity of electricity consumed by the anodization at the highest voltage applied finally is preferably from 0.9 to 20 A·s/cm$^2$. The pores in the vicinity of the interface between the aluminum substrate and the oxide film are rearranged in accordance with the change in voltage when the voltage is changed in the middle of the anodization. The film thickness of the oxide film formed after the voltage reaches the highest value is thick enough to rearrange the pores at an interval proportional to the highest voltage when the quantity of electricity consumed by the anodization at the highest voltage is 0.9 A·s/cm$^2$ or more. In addition, the oxide film formed by the process (a) is not too thick when the quantity of electricity consumed by the anodization at the highest voltage is 20 A·s/cm$^2$ or less, and thus the step of grain boundary of the aluminum substrate can be unnoticeable. This step of grain boundary is also transferred when the fine relief structure of the resulting mold is transferred onto the surface of the body of molded article when the step of grain boundary is as great as visible. As a result, a macro concave and convex as great as visible is formed on the transferred surface, which may cause poor appearance of the resulting molded article.

Meanwhile, the "highest voltage" is the highest value of the voltage in the process (a) and consistent with the voltage (final voltage) immediately before the termination of process (a).

In addition, the current density immediately after the application of voltage is preferably 20 mA/cm$^2$ or less and more preferably 10 mA/cm$^2$ in the process (a). The cloudiness of the mold surface is suppressed, an increase in haze of the molded article obtained by transferring the fine relief structure of the resulting mold can be suppressed, and thus a molded article having a low reflectance is more easily obtained when the current density immediately after the application of voltage is 20 mA/cm$^2$ or less, that is, a jump in current is suppressed. It is possible to further suppress the cloudiness of the mold surface and an increase in haze of the molded article particularly when the current density immediately after the application of voltage is 10 mA/cm$^2$ or less.

Meanwhile, in the invention, the term "immediately after the application of voltage" refers to the moment when the current flows out to the aluminum substrate when a voltage is applied to the aluminum substrate installed in a manufacturing facility. In addition, the "current limiting" denotes that the anodization is performed such that the current density immediately after the application of voltage becomes a predetermined value or less. Typically, only a thin oxide film by air oxidation is formed on the surface of the aluminum substrate at the stage being installed in the manufacturing facility unless otherwise subjected to a special pretreatment. An increase in the current value at the moment when the current flows out to the aluminum substrate is remarkable when a voltage is applied to such an aluminum substrate, and thus the mold tends to be clouded. Thus, in the invention, the time when the current value rapidly increases at the moment when a voltage is applied is denoted as the "immediately after the application of voltage" particularly in the case of not limiting the current value, and it is preferable to set the current density for 1 minute from the start of the application of voltage to 20 mA/cm$^2$ or less in the process (a). In addition, it is preferable to set the current density for 10 seconds from the start of the application of voltage to 20 mA/cm$^2$ or less in the process (c) to be described below.

In the process (a), the current density after the current limiting, that is, after the oxide film derived from the anodization is formed on the surface of the aluminum substrate is not particularly limited, and it may be maintained at 20 mA/cm$^2$ or less or may be greater than 20 mA/cm$^2$. However, the current density also tends to increase as the voltage increases.

The current density can be adjusted by controlling the current by the anodizing apparatus.

Incidentally, the current density decreases when the temperature of the electrolytic solution is lowered even at the same concentration and the same applied voltage in some cases. In addition, the temperature of the electrolytic solution tends to increase by Joule heat due to the applied voltage and the quantity of flowing current when the anodization is carried out by applying a voltage. The electric conductivity of the electrolytic solution also changes as its temperature changes, which causes a variation in the current density in some cases, and thus it is preferable to manage the temperature of the electrolytic solution to be constant during the anodization.

The temperature of the electrolytic solution is preferably 8° C. or higher and more preferably 10° C. or higher from the viewpoint that the temperature of the electrolytic solution can be easily adjusted and maintained. In addition, the concentration of the electrolytic solution may change by the evaporation in the case of using an acid aqueous solution as the electrolytic solution. The temperature of the electrolytic solution is preferably 30° C. or lower from the viewpoint of suppressing a change in the concentration of the electrolytic solution.

Figure 2:
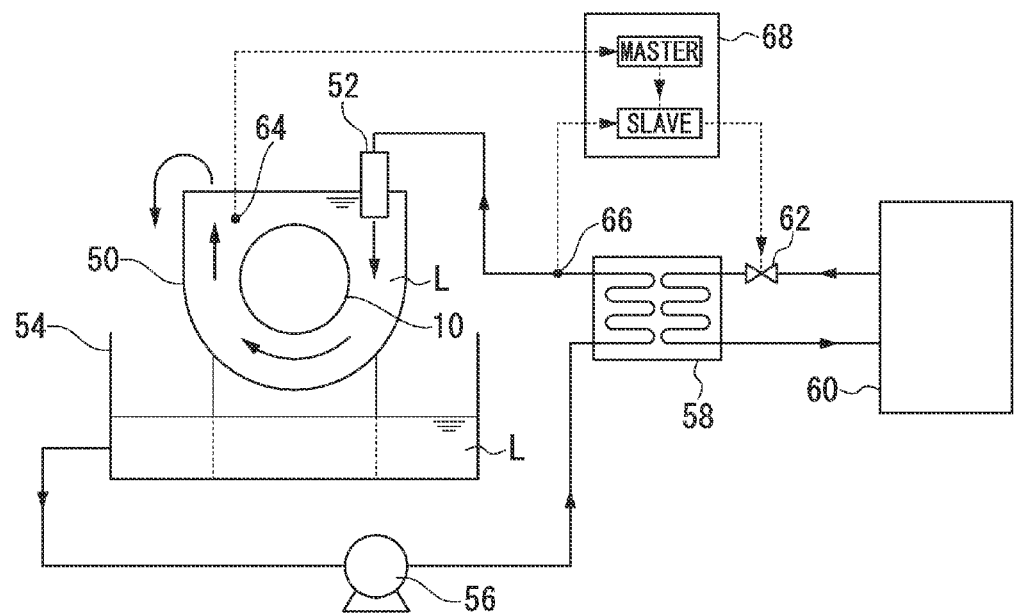
FIG. 2 is a configuration diagram illustrating an example of an apparatus for anodizing an aluminum substrate.

As the apparatus to anodize the aluminum substrate while managing the temperature of the electrolytic solution to be constant during the anodization, for example, those equipped with the configuration illustrated in FIG. 2 is mentioned. Hereinafter, an example of the method of anodizing an aluminum substrate will be described with reference to FIG. 2.

An aluminum substrate 10 is anodized in a treatment tank 50 filled with an electrolytic solution L. The electrolytic solution L in the treatment tank 50 is supplied through a supply nozzle 52 and overflows therefrom to be accumulated in a sub tank 54 installed at the lower part of the treatment tank 50. The electrolytic solution L accumulated in the sub tank 54 is sucked by a pump 56, passes through a heat exchanger 58 to be adjusted to a predetermined temperature, and then is supplied to the treatment tank 50 again through the supply nozzle 52. The aluminum substrate 10 is anodized while the electrolytic solution L is circulated in this manner.

The bottom of the treatment tank 50 preferably has a shape curved to fit the curvature of the aluminum substrate 10.

The supply nozzle 52 is preferably disposed on the upper part of the treatment tank 50.

It is preferable that the electrolytic solution L be supplied through the supply nozzle 52 toward the curved bottom of the treatment tank 50 and overflow from the position facing the supply nozzle 52.

The electrolytic solution L is less likely to retain in the treatment tank 50 and the circulation of the electrolytic solution L can be efficiently performed by adopting the above configuration for the treatment tank 50 and the like. The retention of the electrolytic solution L causes an increase in the temperature of the electrolytic solution L.

A refrigerant is supplied to the heat exchanger 58 from a refrigerator 60 so as to adjust the temperature of the electrolytic solution L. The refrigerant discharged from the heat exchanger 58 returns to the refrigerator 60, is cooled to a predetermined temperature, and is again supplied to the heat exchanger 58.

The flow rate of the refrigerant supplied from the refrigerator 60 is controlled by a control valve 62. It is possible to adjust the temperature of the electrolytic solution L by controlling the flow rate of the refrigerant by the control valve 62. Examples of the control valve 62 may include a solenoid valve equipped with a valve opening of on and off only, a motor valve equipped with an adjustable valve opening, and a control valve.

As the method of controlling the temperature of the electrolytic solution L in the treatment tank 50, it is preferable to use a cascade control as illustrated in FIG. 2 rather than a single control system.

In the case of the single control system, there is a tendency that the responsiveness with respect to the temperature increase immediately after the anodization is faster, but the temperature of the electrolytic solution L supplied through the supply nozzle 52 is hardly stabilized by the temperature variation due to the disturbance in the flow of the electrolytic solution L in the treatment tank 50, and thus the temperature of the electrolytic solution fluctuates when the temperature control of the electrolytic solution L is performed by taking the temperature at an arbitrary location (for example, temperature measuring point 64) in the treatment tank 50 as the reference.

On the other hand, there is a tendency that the temperature of the electrolytic solution L supplied to the treatment tank 50 is stabilized, but the responsiveness due to a change in temperature immediately after the anodization is started is significantly slow, and thus an increase in the temperature of the electrolytic solution L in the treatment tank 50 is greater when the temperature control of the electrolytic solution L is performed by taking the temperature of the electrolytic solution L immediately after being discharged from the heat exchanger 58 (for example, temperature measuring point 66) as the reference.

When using the cascade control as illustrated in FIG. 2, the temperature (SLAVE) of the electrolytic solution immediately after being discharged from the heat exchanger 58 is measured while controlling the temperature (MASTER) thereof in the treatment tank 50 by a controller 68 capable of performing the cascade control so as to be the set temperature, and thus it is possible to stabilize the temperature of the electrolytic solution L supplied through the supply nozzle 52 while maintaining high responsiveness with respect to the temperature increase immediately after the anodization, and it is also possible to control the temperature of the electrolytic solution with significantly high accuracy.

The thickness of the oxide film formed in the process (a) is preferably from 0.5 to 10 µm. The scar on the surface of the aluminum substrate caused by the machining is sufficiently removed when the oxide film is removed in the process (b) to be described below and thus the step of the grain boundary is not as great as visible when the thickness of the oxide film is within this range. It is possible to avoid transferring the macro concave and convex derived from the mold onto the surface of the body of molded article, and thus it is suitable for use as a mold.

The thickness of the oxide film is proportional to the total quantity of electricity consumed by the anodization. It is possible to control the thickness of the oxide film and the ratio of the oxide film formed in the initial anodization and the thickness of the oxide film formed in the final anodization by adjusting the total quantity of electricity or the ratio of the quantity of electricity consumed at every voltage.

(Process (b))

Process (b) is an oxide film removing process to remove at least a part of the oxide film formed in the process (a).

For example, in the case of removing all of the oxide film in the process (b), an oxide film 14 is completely removed and a hollow 16 is exposed on the surface of the aluminum substrate 10 as illustrated in FIG. 1.

A hollow composed of the barrier layer at the bottom of the oxide film or a hollow corresponding to the shape of the barrier layer is formed on the surface of the aluminum substrate by removing a part or all of the oxide film. The hollows formed by removing a part or all of the oxide film in the process (b) are also regularly arranged when the pores which are regularly arranged are formed in the process (a).

Examples of the method of removing a part or all of the oxide film 14 may include a method in which the aluminum substrate subjected to the anodization is immersed in a solution which selectively dissolves alumina but does not dissolve aluminum. Examples of such a solution may include a liquid mixture of chromic acid/phosphoric acid.

(Process (c))

Process (c) is a second oxide film forming process to anodize the aluminum substrate again to form an oxide film with a plurality of pores after the process (b) or the following process (d).

For example, the aluminum substrate 10 is anodized and the oxide film 14 with a plurality of pores 12 is formed again as illustrated in FIG. 1 when the process (c) is performed after the process (b).

In addition, a new oxide film is formed under the existing oxide film and new pores extending downward from the bottom of the existing pores are formed when the process (c) is performed after the following process (d).

When the aluminum substrate is anodized again in a state in which a hollow is formed on its surface, the hollow acts as a pore generating point and new pores of the oxide film are generated at the position corresponding to the hollows. Particularly in a case in which the hollows are regularly arranged, pores which are regularly arranged are formed even in the initial stage of the anodization, that is, a state in which the newly formed oxide film is thin, the depth of the pores is adjusted in a submicron order, and thus the pores which are regularly arranged can be easily produced.

Examples of the electrolytic solution may include an acid aqueous solution or an alkaline aqueous solution, and an acid aqueous solution is preferable. Examples of the acid aqueous solution may include an inorganic acid (for example, sulfuric acid and phosphoric acid) and an organic acid (for example, oxalic acid, malonic acid, tartaric acid, succinic acid, malic acid, and citric acid). One kind of these acids may be used singly or two or more kinds thereof may be used in combination. As an electrolytic solution, those containing an organic acid are preferable and those containing oxalic acid as the main component are particularly preferable. It is easy to obtain a fine relief structure having a relatively great interval of 100 nm or more between pores when the electrolytic solution contains an organic acid. It is easy to obtain a fine relief structure which has a relatively great interval of 100 nm or more between pores and relatively high regularity of pores particularly when oxalic acid is the main component of the electrolytic solution.

In the case of using oxalic acid as the electrolytic solution:

The concentration of oxalic acid is preferably 0.7 M or less. The current value is too high when the concentration of oxalic acid is more than 0.7 M, and thus the surface of the oxide film is coarse in some cases.

The temperature of the electrolytic solution is preferably 60° C. or lower and more preferably 45° C. or lower. The phenomenon, the so-called "burning" takes place when the temperature of the electrolytic solution is higher than 60° C., and thus the pores are broken or the regularity of pores is disordered due to the melting of surface in some cases.

In the case of using sulfuric acid as the electrolytic solution:

The concentration of sulfuric acid is preferably 0.7 M or less. The current value is too high when the concentration of sulfuric acid is more than 0.7 M, and thus it is not able to maintain the constant voltage in some cases.

The temperature of the electrolytic solution is preferably 30° C. or lower and more preferably 20° C. or lower. The phenomenon, the so-called "burning" takes place when the temperature of the electrolytic solution is higher than 30° C., and thus the pores are broken or the regularity of pores is disordered due to the melting of surface in some cases.

The electrolytic solution in the process (c) may be the same as or different from the electrolytic solution used in the process (a). Meanwhile, the proportion of the main acid is not particularly limited in the case of using an electrolytic solution obtained by mixing 2 or more kinds of acids in the process (c). In addition, the kinds of acids may be changed if necessary.

The condition of the applied voltage in the process (c) is preferably 40 V or more, more preferably 60 V or more, even more preferably from 70 to 180 V, and most preferably from 80 to 120 V. It is possible to easily form the oxide film having a relatively great interval (more than 100 nm) between pores particularly when the voltage is 60 V or more. It is possible to anodize the aluminum substrate using a simple apparatus but without using a device to maintain the electrolytic solution at a low temperature or a special technique to jet out a liquid coolant to the back of the aluminum substrate when the voltage is 180 V or less.

It is preferable that the voltage ($V_c$ [V]) immediately before the process (c) be terminated and the time ($t_c$ [sec]) required to reach the voltage ($V_c$ [V]) after applying a voltage satisfy the following Equation (ii) in the process (c).

$$2 < V_c/t_c < 14 \quad (ii)$$

It is possible to shorten the time for the process (c) when $V_c/t_c$ is more than 2, and thus a decrease in the productivity of mold can be suppressed, moreover it is possible to maintain the arrangement of the hollows obtained in the process (b). In addition, it is possible to suppress that a high voltage is applied and thus a jump in current is caused immediately after the application of voltage in the process (c) when $V_c/t_c$ is less than 14. Consequently, the cloudiness of the mold surface is suppressed, an increase in haze of the molded article obtained by transferring the fine relief structure of the resulting mold can be suppressed, and thus a molded article having a low reflectance is obtained.

$V_c/t_c$ is preferably more than 2 and less than 10 and more preferably more than 2 and less than 7.

In addition, the applied voltage in the process (c) is preferably the same as the applied voltage in the final anodization of the process (a) from the viewpoint that the depth of the pores is easily adjusted while maintaining the interval between pores obtained in the process (a).

In addition, the anodization may be finally performed at a higher voltage than the initial anodization in the process (c) in the same manner as in the process (a). In such a case, the voltage may be raised in a stepwise manner or continuously from the initial anodization to the final anodization, and it is preferable to perform the anodization while raising the voltage in a stepwise manner.

The energizing time in the process (c) is preferably from 3 to 60 seconds. The thickness of the finally obtained oxide film is likely to be 0.01 µm or more to be described below when the energizing time is 3 seconds or longer. The depth of the pores is also less than 0.01 µm in the case of the oxide film having a thickness of less than 0.01 µm, and thus there is a concern that the resulting molded article does not exhibit sufficient antireflection performance in the case of using the resulting aluminum substrate as a mold. The thickness of the finally obtained oxide film is likely to be 0.8 µm or less to be described below when the energizing time is 60 seconds or shorter. The depth of the pores is also as deep as the oxide film is thick in the case of the oxide film having a thickness of more than 0.8 µm, and thus there is a concern that a mold release failure is caused in the case of using the resulting aluminum substrate as a mold.

In the process (c) after the process (b), the current density immediately after the application of voltage, that is, the current density for 10 seconds from the start of the application of voltage is 20 mA/cm² or less and may be more preferably 10 mA/cm² or less. The cloudiness of the mold surface is further suppressed, an increase in haze of the molded article obtained by transferring the fine relief structure of the resulting mold can be more effectively suppressed, and thus a molded article having a lower reflectance is obtained when the current density immediately after the application of voltage is 20 mA/cm² or less, that is, a jump in current is suppressed.

In the process (c), the current density after the current limiting, that is, after the oxide film derived from the anodization is formed on the surface of the aluminum substrate is not particularly limited, and it may be maintained at 20 mA/cm² or less or it may be more than 20 mA/cm². However, the current density also tends to increase as the voltage increases.

The conditions (kind, concentration, temperature and the like of electrolytic solution) of the anodization in the process (c) are not required to be necessarily consistent with those in the process (a) and may be appropriately changed to the conditions by which the thickness of the oxide film is easily adjusted.

(Process (d))

Process (d) is a process to remove a part of the oxide film formed in the process (c).

For example, a part of the oxide film 14 formed by the process (c) is removed and the pore size of the pores 12 is expanded as illustrated in FIG. 1 when performing the process (d) after the process (c). Hence, the process (d) is also a pore size expanding treatment process.

As a specific method to remove a part of the oxide film, that is, to expand the pore size, a method is mentioned in which the aluminum substrate subjected to the anodization is immersed in a solution to dissolve alumina and thus the pores formed on the oxide film are etched to be expanded. Examples of such a solution may include an aqueous phosphoric acid solution of about 5.0% by mass. The pore size of the pores is greater as the time for immersion is longer.
(Process (e))

Process (e) is a repeating process to alternately repeat the process (c) and the process (d) so as to adjust the depth and shape of the pores.

For example, it is possible to shape the pores 12 to a tapered shape of which the diameter gradually decreases in the depth direction from the opening as illustrated in FIG. 1 when the process (c) and the process (d) are alternately repeated, as a result, it is possible to obtain a mold 18 having the oxide film 14 composed of a plurality of pores 12 which are periodically arranged formed on the surface.

It is possible to form an oxide film having pores of various shapes by appropriately setting the conditions of the process (c) and the process (d), for example, the concentration of electrolytic solution and the oxidation time for the anodization, the time for the pore size expanding treatment, and the temperature and concentration of the solution utilized in the pore size expanding treatment. These conditions may be appropriately set depending on the application of the molded article manufactured using the mold.

The number of the process (c) is preferably at least 3 times including the process (c) performed prior to the process (e) from the viewpoint that it is possible to form a smoother tapered shape as the number increases. Similarly, the number of the process (d) is also preferably at least 3 times including the process (d) performed prior to the process (e) from the viewpoint that it is possible to form a smoother tapered shape as the number increases. The pore size of the pores tends to discontinuously decreases in a case in which the number of each process is 2 times or fewer, and thus there is a possibility that the reflectance reducing effect is poor in a case in which an antireflection product (antireflection film and the like) is manufactured using such a mold.

The process (e) may be terminated by the process (c) or the process (d).

It is possible to obtain deeper pores as the anodization is performed for a longer time in the process (c) and the process (e), but the thickness of the oxide film which is finally obtained via the process (e) may be about from 0.01 to 0.8 μm in the case of using as a mold for transferring a fine relief structure. The conditions (kind, concentration, temperature and the like of electrolytic solution) of the anodization except the voltage in the process (c) are not required to be necessarily consistent with those in the process (a) and may be appropriately changed to the conditions by which the thickness of the oxide film is easily adjusted. In addition, each process is not required to be performed under the same conditions as each process which is previously performed and the various conditions can be appropriately changed when repeating the process (c) and the process (d).
(Mold)

According to the method of manufacturing a mold of the invention, the pores having a tapered shape of which the diameter gradually decreases in the depth direction from the opening are formed on the surface of the aluminum substrate in a relatively regularly arranged manner, as a result, it is possible to manufacture a mold having an oxide film (anodic porous alumina) having a fine relief structure formed on the surface.

The average interval between the adjacent pores in the mold is preferably equal to or shorter than the wavelength of visible light and more preferably from 150 to 600 nm. It is possible to improve the excoriation resistance performance without impairing the antireflection performance of the molded article (antireflection product and the like) obtained by transferring the surface of the mold and to suppress the whitening of the molded article caused by the coalescence of the protrusions when the average interval between pores is 150 nm or more. The scattering of visible light is less likely to occur on the surface (transferred surface) of the molded article obtained by transferring the surface of the mold and a sufficient antireflection function is exerted when the average interval between pores is 600 nm or less, and thus the mold is suitable for the manufacture of the antireflection product such as an antireflection film.

In addition, the depth of the pores is preferably 100 nm or more and more preferably 150 nm or more as well as the average interval between pores is 600 nm or less in the case of using the mold for the manufacture of the antireflection product (antireflection film and the like). There is a concern that the antireflection performance of the antireflection product is not sufficient in the case of using a mold having a depth of the pores of less than 100 nm.

In addition, the aspect ratio (=depth/average interval) of the pores of the mold is preferably 0.25 or more, even more preferably 0.5 or more, and most preferably 0.75 or more. It is possible to form a surface having a low reflectance and the incident angle dependence thereof is also low when the aspect ratio is 0.25 or more.

The surface of the mold having a fine relief structure formed thereon may be subjected to the mold release treatment so that mold release is facilitated. Examples of the method of mold release treatment may include a method to coat a phosphate ester-based polymer, a silicone-based polymer, a fluoropolymer or the like, a method to deposit a fluorine compound, and a method to coat a fluorine-based surface treatment agent or a fluorine silicone-based surface treatment agent.
(Effect)

In the method of manufacturing a mold of the invention described above, the anodization is performed by applying a voltage to the aluminum substrate such that the voltage ($V_a$ [V]) immediately before the process (a) is terminated and the time ($t_a$ [sec]) required to reach the voltage ($V_a$ [V]) after starting the application of voltage satisfy Equation (i) above in the first stage anodization process (process (a)). It is possible to form the oxide film which is initially formed while suppressing a jump in current immediately after the application of voltage by performing the anodization in this manner. Consequently, it is possible to suppress the occurrence of white streak even when the aluminum substrate that has been machined is anodized, and thus it is possible to manufacture a mold having a surface with suppressed cloudiness. It is possible to obtain a molded article having a low haze, a sufficiently lowered reflectance, and a fine relief structure on the surface when using this mold.

It is possible to manufacture a mold having a relatively great interval between pores and a surface with suppressed cloudiness particularly when the anodization is finally performed at 60 V or more in the process (a).

Meanwhile, it is possible to suppress the cloudiness of the mold surface when the aluminum substrate is subjected to the cathodic electrolysis, electrolytic polishing, or etching prior to the first stage anodization process as described in Patent Document 1, but the number of processes increases and thus it is complicated.

However, according to the method of manufacturing a mold of the invention, it is possible to suppress the cloudiness of the mold surface by only the current limiting in the first stage anodization process (process (a)). Consequently, it is possible to simply manufacture a mold having a surface with suppressed cloudiness according to the invention.

The cloudiness of the mold surface is further suppressed, an increase in haze of the molded article obtained by transferring the fine relief structure of the resulting mold can be more effectively suppressed, and thus a molded article having a lowered reflectance is easily obtained when the current density immediately after the application of voltage is 20 mA/cm$^2$ or less, or the initial anodization is performed at 50 V or more and the anodization is finally performed at a higher voltage (for example, 60 V or more) than the initial anodization.

<Molded Article and Method of Manufacturing the Same>

The method of manufacturing a molded article having a fine relief structure on the surface of the invention is a method to transfer a fine relief structure composed of a plurality of pores formed on the surface of the mold obtained by the method of manufacturing a mold of the invention onto the surface of the body of molded article.

In the molded article manufactured by transferring the fine relief structure (pores) of the mold, the inverted structure (protrusions) of the fine relief structure of the mold is transferred onto the surface thereof in the lock-and-key relationship.

Examples of the method of transferring the fine relief structure of the mold onto the surface of the body of molded article may preferably include a method in which an uncured active energy ray-curable resin composition is filled between the mold and the body of molded article (transparent substrate), the active energy ray-curable resin composition is cured by irradiating with an active energy ray in a state in which the active energy ray-curable resin composition is in contact with the fine relief structure of the mold, and then the mold is released therefrom. This makes it possible to manufacture a molded article having a fine relief structure composed of the cured product of an active energy ray-curable resin composition formed on the surface of the body of molded article. The fine relief structure of the molded article thus obtained has the inverted structure of the fine relief structure of the mold.

(Body of Molded Article)

The body of molded article (transparent substrate) is preferably those which do not significantly inhibit the irradiation of active energy ray since the irradiation of active energy ray is performed via the body of molded article. Examples of the material of the body of molded article may include a polyester resin (polyethylene terephthalate, polybutylene terephthalate), a polymethacrylate resin, a polycarbonate resin, a vinyl chloride resin, an ABS resin, a styrene resin, and glass.

(Active Energy Ray-Curable Resin Composition)

The method using an active energy ray-curable resin composition enables to transfer the fine relief structure in a short period of time since it does not require cooling after heating or curing as compared to the method using a thermosetting resin composition, and thus the method is suitable for mass production.

Examples of the method of filling the active energy ray-curable resin composition may include a method in which the active energy ray-curable resin composition is supplied between the mold and the body of molded article (transparent substrate) and then filled by rolling, a method in which the body of molded article is laminated on the mold coated with the active energy ray-curable resin composition, and a method in which the body of molded article is coated with the active energy ray-curable resin composition in advance and then laminated on the mold.

The active energy ray-curable resin composition contains a polymerization reactive compound and an active energy ray-polymerization initiator. In addition to those described above, an unreactive polymer or an active energy ray sol-gel reactive component may be contained therein depending on the application, or various additives such as a thickener, a leveling agent, an ultraviolet absorber, a light stabilizer, a heat stabilizer, a solvent, and an inorganic filler may be contained therein.

Examples of the polymerization reactive compound may include a monomer, an oligomer, and a reactive polymer which have a radically polymerizable bond and/or cationically polymerizable bond in the molecule.

Examples of the monomer having a radically polymerizable bond may include a monofunctional monomer and a polyfunctional monomer.

Examples of the monofunctional monomer having a radically polymerizable bond may include a (meth)acrylate derivative (methyl(meth)acrylate, ethyl(meth)acrylate, propyl(meth)acrylate, n-butyl(meth)acrylate, i-butyl(meth)acrylate, s-butyl(meth)acrylate, t-butyl(meth)acrylate, 2-ethylhexyl(meth)acrylate, lauryl(meth)acrylate, alkyl(meth)acrylate, tridecyl(meth)acrylate, stearyl(meth)acrylate, cyclohexyl(meth)acrylate, benzyl(meth)acrylate, phenoxyethyl(meth)acrylate, isobornyl(meth)acrylate, glycidyl(meth)acrylate, tetrahydrofurfuryl(meth)acrylate, allyl(meth)acrylate, 2-hydroxyethyl(meth)acrylate, hydroxypropyl(meth)acrylate, 2-methoxyethyl(meth)acrylate, 2-ethoxyethyl(meth)acrylate and the like), (meth)acrylic acid, (meth)acrylonitrile, a styrene derivative (styrene, α-methyl styrene and the like), a (meth)acrylamide derivative ((meth)acrylamide, N-dimethyl(meth)acrylamide, N-diethyl(meth)acrylamide, dimethylaminopropyl(meth)acrylamide and the like). One kind of these may be used singly or two or more kinds thereof may be used in combination.

Examples of the polyfunctional monomer having a radically polymerizable bond may include a difunctional monomer (ethylene glycol di(meth)acrylate, tripropylene glycol di(meth)acrylate, isocyanuric acid ethylene oxide-modified di(meth)acrylate, triethylene glycol di(meth)acrylate, diethylene glycol di(meth)acrylate, neopentyl glycol di(meth)acrylate, 1,6-hexanediol di(meth)acrylate, 1,5-pentanediol di(meth)acrylate, 1,3-butylene glycol di(meth)acrylate, polybutylene glycol di(meth)acrylate, 2,2-bis(4-(meth)acryloxypolyethoxyphenyl)propane, 2,2-bis(4-(meth)acryloxyethoxyphenyl)propane, 2,2-bis(4-(3-(meth)acryloxy-2-hydroxypropoxy)phenyl)propane, 1,2-bis(3-(meth)acryloxy-2-hydroxypropoxy)ethane, 1,4-bis(3-(meth)acryloxy-2-hydroxypropoxy)butane, dimethylol tricyclodecane di(meth)acrylate, bisphenol A-ethylene oxide adduct di(meth)acrylate, bisphenol A-propylene oxide adduct di(meth)acrylate, hydroxypivalic acid neopentyl glycol di(meth)acrylate, divinyl benzene, methylene bisacrylamide and the like), a trifunctional monomer (pentaerythritol tri(meth)acrylate, trimethylolpropane tri(meth)acrylate, trimethylolpropane ethylene oxide-modified tri(meth)acrylate, trimethylolpropane propylene oxide modified triacrylate, trimethylolpropane ethylene oxide-modified triacrylate, isocyanuric acid ethylene oxide-modified tri(meth)acrylate and the like), a tetra- or higher functional monomer (a condensation reaction mixture of succinic acid/trimethylolethane/acrylic acid, dipentaerythritol hexa(meth)acrylate, dipentaerythritol penta(meth)acrylate, ditrimethylolpropane tetraacrylate, tetramethylolmethane tetra(meth)acrylate and the like), a di- or higher functional urethane acrylate, and a di- or higher functional polyester acrylate. One kind of these may be used singly or two or more kinds thereof may be used in combination.

Examples of the monomer having a cationically polymerizable bond may include a monomer having an epoxy group, an oxetanyl group, an oxazolyl group, a vinyloxy group and the like, and a monomer having an epoxy group is particularly preferable.

Examples of the oligomer or the reactive polymer which has a radically polymerizable bond and/or cationically polymerizable bond in the molecule may include an unsaturated polyester such as a condensate of an unsaturated dicarboxylic acid with a polyhydric alcohol; a polyester (meth)acrylate, a polyether(meth)acrylate, a polyol(meth)acrylate, an epoxy(meth)acrylate, a urethane(meth)acrylate, a cationic polymerization type epoxy compound, and a homopolymer or copolymer of the monomer having a radically polymerizable bond in a side chain described above.

It is possible to use a known polymerization initiator as the active energy ray-polymerization initiator, and the polymerization initiator is preferably selected depending on the kind of the active energy ray used when curing the active energy ray-curable resin composition.

In the case of using a photocuring reaction, examples of the photopolymerization initiator may include a carbonyl compound (benzoin, benzoin methyl ether, benzoin ethyl ether, benzoin isopropyl ether, benzoin isobutyl ether, benzyl, benzophenone, p-methoxybenzophenone, 2,2-diethoxyacetophenone, α,α-dimethoxy-α-phenylacetophenone, methylphenyl glyoxylate, ethylphenyl glyoxylate, 4,4'-bis(dimethylamino)benzophenone, 2-hydroxy-2-methyl-1-phenylpropan-1-one and the like), a sulfur compound (tetramethylthiuram monosulfide, tetramethylthiuram disulfide and the like), 2,4,6-trimethylbenzoyldiphenylphosphine oxide, bis(2,4,6-trimethylbenzoyl)-phenylphosphine oxide, and benzoyldiethoxyphosphine oxide. One kind of these may be used singly or two or more kinds thereof may be used in combination.

In the case of using an electron beam curing reaction, examples of the polymerization initiator may include benzophenone, 4,4-bis(diethylamino)benzophenone, 2,4,6-trimethylbenzophenone, methyl o-benzoylbenzoate, 4-phenylbenzophenone, t-butyl anthraquinone, 2-ethyl anthraquinone, a thioxanthone(2,4-diethylthioxanthone, isopropylthioxanthone, 2,4-dichlorothioxanthone and the like), acetophenone (diethoxyacetophenone, 2-hydroxy-2-methyl-1-phenylpropan-1-one, benzyl dimethyl ketal, 1-hydroxycyclohexyl-phenyl ketone, 2-methyl-2-morpholino (4-thiomethylphenyl)propan-1-one, 2-benzyl-2-dimethylamino-1-(4-morpholinophenyl)-butanone and the like), a benzoin ether (benzoin methyl ether, benzoin ethyl ether, benzoin isopropyl ether, benzoin isobutyl ether and the like), an acylphosphine oxide (2,4,6-trimethyl benzoyl diphenylphosphine oxide, bis(2,6-dimethoxybenzoyl)-2,4,4-trimethylpentylphosphine oxide, 2,4,6-trimethylbenzoyldiphenylphosphine oxide, bis(2,4,6-trimethylbenzoyl) phenylphosphine oxide and the like), methyl benzoylformate, 1,7-bisacridinyl heptane, and 9-phenyl acridine. One kind of these may be used singly or two or more kinds thereof may be used in combination.

The content of the active energy ray-polymerization initiator in the active energy ray-curable resin composition is preferably from 0.1 to 10 parts by mass with respect to 100 parts by mass of the polymerization reactive compound. The polymerization hardly proceeds when the active energy ray-polymerization initiator is less than 0.1 part by mass. On the other hand, cured resin is colored or the mechanical strength is lowered in some cases when the active energy ray-polymerization initiator is more than 10 parts by mass.

Examples of the unreactive polymer may include an acrylic resin, a styrene resin, a polyurethane resin, a cellulose resin, a polyvinyl butyral resin, a polyester resin, and a thermoplastic elastomer.

Examples of the active energy ray sol-gel reactive composition may include an alkoxysilane compound, and an alkyl silicate compound.

Examples of the alkoxysilane compound may include those represented by $R_xSi(OR')_y$. R and R' represent an alkyl group having from 1 to 10 carbon atoms, and x and y represent an integer satisfying the relation of x+y=4. Specific examples thereof may include tetramethoxysilane, tetra-iso-propoxysilane, tetra-n-propoxysilane, tetra-n-butoxysilane, tetra-sec-butoxysilane, tetra-tert-butoxysilane, methyltriethoxysilane, methyltripropoxysilane, methyltributoxysilane, dimethyldimethoxysilane, dimethyldiethoxysilane, trimethylethoxysilane, trimethylmethoxysilane, trimethylpropoxysilane, and trimethylbutoxysilane.

Examples of the alkyl silicate compound may include those represented by $R^1O[Si(OR^3)(OR^4)O]_zR^2$. $R^1$ to $R^4$ each represent an alkyl group having from 1 to 5 carbon atoms, and z is an integer from 3 to 20. Specific examples thereof may include methyl silicate, ethyl silicate, isopropyl silicate, n-propyl silicate, n-butyl silicate, n-pentyl silicate, and acetyl silicate.

(Manufacturing Apparatus)

Figure 3:
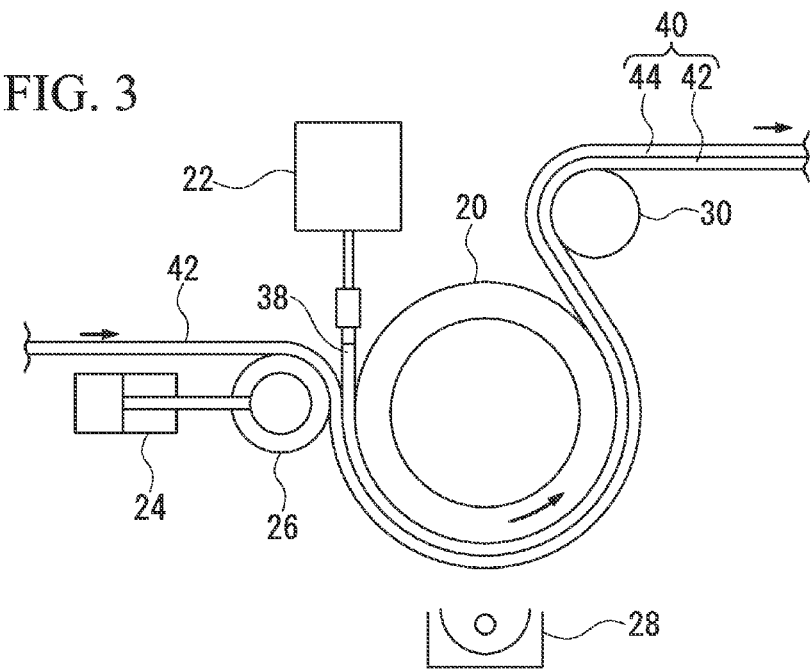
FIG. 3 is a configuration diagram illustrating an example of a manufacturing apparatus for a molded article having a fine relief structure on the surface.

The molded article having a fine relief structure on the surface is manufactured as follows, for example, using a manufacturing apparatus illustrated in FIG. 3.

An active energy ray-curable resin composition 38 is supplied between a roll-shaped mold 20 having a fine relief structure (not illustrated) on the surface and a belt-shaped film 42 (body of molded article) which moves along the surface of the roll-shaped mold 20 from a tank 22.

The film 42 and the active energy ray-curable resin composition 38 are nipped between the roll-shaped mold 20 and a nip roll 26 having a nip pressure adjusted by a pneumatic cylinder 24, the active energy ray-curable resin composition 38 is filled in the concave portion of the fine relief structure of the roll-shaped mold 20 and is uniformly spread between the film 42 and the roll-shaped mold 20 at the same time.

The active energy ray-curable resin composition 38 is irradiated with an active energy ray from an active energy ray irradiation device 28 installed downward the roll-shaped mold 20 through the film 42 to cure the active energy ray-curable resin composition 38, thereby forming a cured resin layer 44 having a fine relief structure transferred from the surface of the roll-shaped mold 20.

Figure 4:
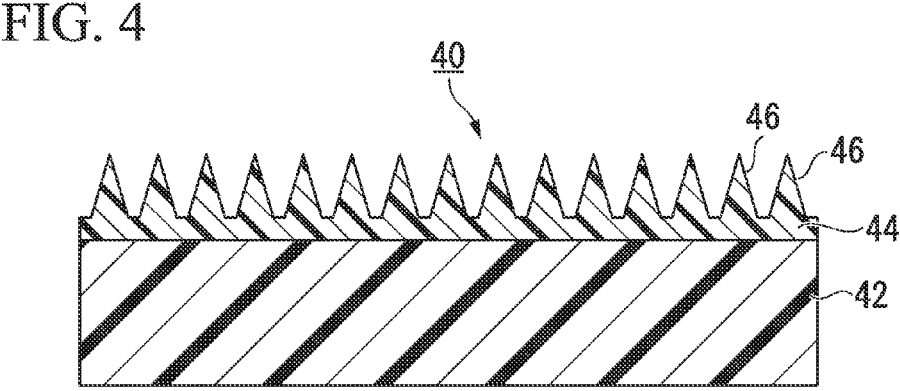
FIG. 4 is a cross-sectional diagram illustrating an example of a molded article having a fine relief structure on the surface.

The film 42 having the cured resin layer 44 formed on the surface is peeled off from the roll-shaped mold 20 using a peeling roll 30, thereby obtaining a molded article 40 as illustrated in FIG. 4.

Examples of the active energy ray irradiation device 28 may include a high pressure mercury lamp and a metal halide lamp.

The dose of the active energy ray may be any energy quantity as long as the curing of the active energy ray-curable resin composition proceeds and is usually about from 100 to 10000 mJ/cm².

(Molded Article)

The molded article 40 thus manufactured is one having the cured resin layer 44 formed on the surface of the film 42 (body of molded article) as illustrated in FIG. 4.

The cured resin layer 44 is a film composed of a cured product of an active energy ray-curable resin composition and has a fine relief structure on the surface.

The fine relief structure on the surface of the molded article 40 in the case of using the mold obtained by the invention is formed by transferring the fine relief structure on the surface of the oxide film and has a plurality of protrusions 46 composed of the cured product of an active energy ray-curable resin composition.

As the fine relief structure, the so-called moth-eye structure in which a plurality of protrusions (convex portion) such as a substantially conical shape and a pyramid shape are lined up is preferable. The moth-eye structure having an interval between the protrusions of equal to or shorter than the wavelength of visible light is known to be an effective antireflection means since the refractive index continuously increases from the refractive index of air to the refractive index of the material.

(Application)

The molded article which is obtained by the invention and has a fine relief structure on the surface exhibits a variety of performance such as antireflection performance and water repellent performance by the fine relief structure on the surface.

It is possible to use the molded article as an antireflection film by pasting to the surface of an object such as an image display device (display of TV and mobile phone, and the like), a display panel, and a meter panel or by insert molding with the object in a case in which the molded article having a fine relief structure on the surface has a sheet shape or a film shape. In addition, the molded article can be used as a member of an object that may be exposed to rain, water, steam and the like such as a window and a mirror in the bathroom, a solar cell member, a car mirror, a signboard, and a lens of eye glasses to utilize the water repellent performance.

In a case in which the molded article having a fine relief structure on the surface has a three-dimensional shape, it is possible to manufacture an antireflection product using the body of molded article (transparent substrate) shaped in accordance with the application and this can also be used as a member constituting the surface of the object described above.

In addition, in a case in which the object is an image display device, the molded article having a fine relief structure on the surface is not only pasted to the surface but may also be pasted to the front plate, or the front plate itself can be constituted by the molded article having a fine relief structure on the surface. The molded article having a fine relief structure on the surface may also be used, for example, in the surface of the rod lens array attached to the sensor array to read the image, a cover glass of the image sensor such as FAX, a copying machine, and a scanner, and a contact glass of the copying machine to put the document. In addition, it is also possible to improve the reception sensitivity of the signals by using the molded article having a fine relief structure on the surface in the light receiving section and the like of an optical device such as visible light communication.

In addition, the molded article having a fine relief structure on the surface can be utilized in the optical application such as an optical waveguide, a relief hologram, an optical lens, and a polarizing beam splitter and the application as a cell culture sheet other than the applications described above.

(Effect)

In the method of manufacturing the molded article having a fine relief structure on the surface of the invention described above, the fine relief structure on the surface of the mold obtained by the method of manufacturing a mold of the invention is transferred onto the surface of the body of molded article, and thus it is possible to manufacture a molded article having a low haze (specifically, 5% or less) and a sufficiently lowered reflectance.

In addition, according to the invention, it is possible to simply manufacture a molded article having an inverted structure of the fine relief structure of the mold on the surface by one process by using the mold obtained by the method of manufacturing a mold of the invention.

Meanwhile, the molded article having a fine relief structure on the surface is not limited to the molded article 40 of the illustrated example. For example, the fine relief structure may be directly formed on the surface of the film 42 by the thermal imprinting method without providing the cured resin layer 44. However, it is preferable that the fine relief structure be formed on the surface of the cured resin layer 44 from the viewpoint that the fine relief structure can be efficiently formed using the roll-shaped mold 20.

EXAMPLES

Hereinafter, the invention will be specifically described with reference to Examples, but the invention is not limited thereto.

Various kinds of measurement and evaluation were conducted by the following methods.

(Measurement of Time Required to Reach Final Voltage)

The transition of the voltage with time in the anodization treatment corresponding to the process (a) was recorded at one second intervals by a data logger ("ZR-RX40" manufactured by OMRON Corporation). The time ($t_a$ [sec]) required to reach the final voltage (voltage ($V_a$ [V]) immediately before the process (a) is terminated) after starting the application of voltage was measured, and $V_a/t_a$ was determined.

(Measurement of Pores of Mold)

A part of the mold having an oxide film formed on the surface was cut, platinum was deposited on its surface for 1 minute, and the resultant was observed at an accelerating voltage of 3.00 kV and a magnification of 10,000 times using a field emission scanning electron microscope ("JSM-6701F" manufactured by JEOL Ltd.). The average interval (pitch) between pores was determined by averaging the distances between the centers of six pores arranged in a straight line.

In addition, a part of the mold was cut out from two different locations, platinum was deposited on the longitudinal section thereof for 1 minute, and the resultants were observed at an acceleration voltage of 3.00 kV as well using the field emission scanning electron microscope. The sample for each cross section was observed at a magnification of 50,000 times, the depth of 10 pores in the observed area was measured and averaged. The measurement was conducted at two points, and the average values for respective observation points were further averaged to determine the average depth of the pores.

(Measurement of Protrusion of Molded Article)

Platinum was deposited on the surface and longitudinal section of the molded article (film) for 10 minutes, and the surface and cross section of the molded article was observed using a field emission scanning electron microscope ("JSM-6701F" manufactured by JEOL Ltd.) under a condition of an accelerating voltage of 3.00 kV.

The surface of the molded article was observed at a magnification of 10,000 times, and the average interval (pitch) between the protrusions was determined by averaging the distances between the centers of six protrusions (convex portion) arranged in a straight line. In addition, the cross section of the molded article was observed at a magnification of 50,000 times, and the average height of the protrusions was determined by averaging the heights of ten protrusions.

(Evaluation on Appearance)

The appearance of the aluminum substrate surface after the termination of process (a) was visually evaluated. The evaluation criteria are presented below.

○: the surrounding scene is clearly mirrored on the aluminum substrate surface.

Δ: the surrounding scene is mirrored on the aluminum substrate surface, but the contour of the mirrored things is blurred.

×: the aluminum substrate surface is not lustrous and thus the surrounding scene is not mirrored. Alternatively, the mirrored things are not distinguishable.

(Measurement of Haze)

The haze of the molded article (film) was measured using a haze meter (manufactured by Suga Test Instruments Co., Ltd.) in conformity with JIS K 7361-1: 1997 (ISO 13468-1: 1996).

Example 1

(Manufacture of Mold)

The massive aluminum having a purity of 99.97% by mass was cut into a roll shape having a diameter of 200 mm and a width of 320 mm, its surface was subjected to the cutting to have a mirror finished surface, and this was used as the aluminum substrate. The material of the substrate is presented in Table 1. Meanwhile, in the table, the "Al" represents aluminum, and the "3N7" represents the purity of aluminum and means a purity of 99.97% by mass.

Process (a):

The temperature of a 0.05 M aqueous solution of oxalic acid was adjusted to 15.7° C., and the aluminum substrate was immersed in the aqueous solution and anodized under the following conditions.

The anodization was started at a voltage of 40 V while carrying out the current limiting so as to have a current density for 1 minute of 2.5 mA/cm² from the start of the application of voltage. The anodization was performed while maintaining the voltage of 40 V for 43 minutes, the voltage was then raised up to 80 V, and the anodization was continued at 80 V for 2 minutes, thereby forming an oxide film having pores.

Figure 5:
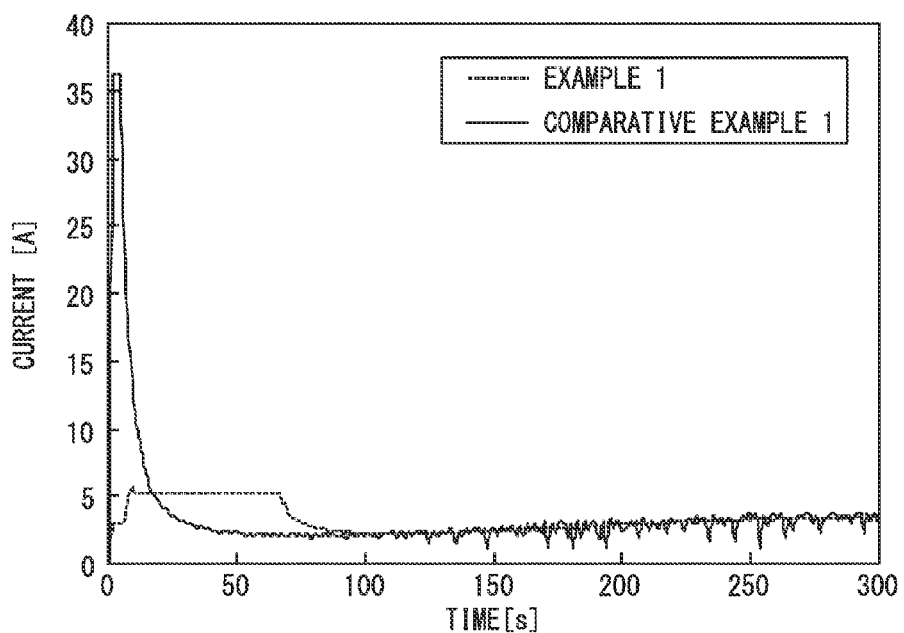
FIG. 5 is a graph illustrating a change in current in Example 1 and Comparative Example 1.

The voltage and time in the process (a), the current density and current for 1 minute from the start of the application of voltage, the time required to reach the final voltage and $V_a/t_a$, and the kind of electrolytic solution used in the process (a) (hereinafter, these are referred to as the "conditions for anodization") are presented in Table 1. In addition, the appearance of the aluminum substrate surface after the termination of process (a) was evaluated. The result is presented in Table 1. Furthermore, the change in current during the time until 5 minutes elapses from the start of the application of voltage is illustrated in FIG. 5.

Process (b):

The aluminum substrate having an oxide film formed thereon was immersed in an aqueous solution prepared by mixing phosphoric acid of 6% by mass and chromic acid of 1.8% by mass at 70° C. for 3 hours to dissolve and remove the oxide film, thereby exposing the hollows to be the pore generating points of the anodization.

Process (c):

The aluminum substrate having the pore generating points exposed was immersed in a 0.05 M aqueous solution of oxalic acid having a temperature adjusted to 15.7° C. and anodized at 80 V for 14 seconds, thereby forming an oxide film on the surface of the aluminum substrate again.

Meanwhile, the current density for 10 seconds from the start of the application of voltage was 19.9 mA/cm². In addition, the time required to reach 80 V was 13 seconds. In other words, it was $V_c/t_c=6.154$.

Process (d):

The aluminum substrate having an oxide film formed thereon was immersed in an aqueous phosphoric acid solution of 5% by mass having a temperature adjusted to 31.7° C. for 17 minutes so as to perform the pore size expanding treatment to expand the pores of the oxide film.

Process (e):

The process (c) and the process (d) were alternately repeated further 4 times. The process (d) was finally performed. In other words, the process (c) was performed 5 times in total and the process (d) was performed 5 times in total.

Thereafter, the resultant was washed with deionized water and further the moisture on the surface was removed by air blow, thereby obtaining a mold on which an oxide film having pores which has a substantially conical shape, an average interval of 180 nm, and an average depth of about 230 nm is formed.

The mold obtained in this manner was immersed in an aqueous solution prepared by diluting TDP-8 (manufactured by Nikko Chemicals Co., Ltd.) to 0.1% by mass for 10 minutes and air dried overnight so as to perform the mold release treatment.

(Manufacture of Molded Article)

An active energy ray-curable resin composition having the following composition was filled between the mold release-treated mold and the acrylic film ("ACRYPLEN HBS010" manufactured by Mitsubishi Rayon Co., Ltd.) of the body of molded article (transparent substrate), and the active energy ray-curable resin composition was cured by irradiating with ultraviolet light in an integrated light quantity of 1000 mJ/cm² using a high pressure mercury lamp. Thereafter, the mold was peeled off therefrom so as to obtain a molded article (film) composed of the body of molded article and the cured product of the curing composition.

A fine relief structure was formed on the surface of the molded article manufactured in this manner, and the average interval (pitch) between the protrusions was 180 nm and the average height of the protrusions was about 220 nm.

The haze of the molded article thus obtained was measured. The result is presented in Table 1.

Active energy ray-curable resin composition:

dipentaerythritol hexaacrylate (manufactured by SHIN-NAKAMURA CHEMICAL CO., LTD.): 25 parts by mass, pentaerythritol triacrylate (manufactured by DAI-ICHI KOGYO SEIYAKU CO., LTD.): 25 parts by mass, ethylene oxide-modified dipentaerythritol hexaacrylate (manufactured by Nippon Kayaku Co., Ltd.): 25 parts by mass, polyethylene glycol diacrylate (manufactured by TOAGOSEI CO., LTD.): 25 parts by mass, 1-hydroxycyclohexyl phenyl ketone (manufactured by BASF): 1 part by mass, bis(2,4,6-trimethylbenzoyl)-phenylphosphine oxide (manufactured by BASF): 0.5 part by mass, and polyoxyethylene alkyl(12 to 15) ether phosphate (manufactured by Nippon Chemicals Sales Co.): 0.1 parts by mass.

Example 2

The mold was manufactured in the same manner as in Example 1 except that the conditions for anodization in the process (a) were changed to those described in Table 1, and a molded article was then manufactured using the mold thus obtained.

The conditions for anodization in the process (a), the result of the evaluation on the appearance of the aluminum substrate surface after the termination of process (a), and the measured result of the haze of the molded article are presented in Table 1. Meanwhile, the "oxalic acid/phosphoric acid" in the table is a mixed aqueous solution prepared by adding phosphoric acid to a 0.3 M aqueous solution of oxalic acid and adjusting the concentration of phosphoric acid to be 0.1 M.

Example 3

The massive aluminum prepared by adding magnesium corresponding to 1% by mass to aluminum having a purity of 99.996% by mass was cut into a roll shape having a diameter of 200 mm and a width of 320 mm, its surface was subjected to the cutting to have a mirror finished surface, and this was used as the aluminum substrate.

The mold was manufactured in the same manner as in Example 1 except that this aluminum substrate was used and the conditions for anodization in the process (a) were changed to those described in Table 1, and a molded article was then manufactured using the mold thus obtained.

The conditions for anodization in the process (a), the result of the evaluation on the appearance of the aluminum substrate surface after the termination of process (a), and the measured result of the haze of the molded article are presented in Table 1. Meanwhile, in the table, the "4N6" represents the purity of aluminum and means a purity of 99.996% by mass. In addition, the "+Mg(1%)" means that magnesium corresponding to 1% by mass is added to aluminum.

Example 4

The massive aluminum prepared by adding magnesium corresponding to 1% by mass to aluminum having a purity of 99.996% by mass was cut into a roll shape having a diameter of 200 mm and a width of 320 mm, its surface was subjected to the cutting to have a mirror finished surface, and this was used as the aluminum substrate.

This aluminum substrate was used, and the current limiting was carried out so as to have the current density for 1 minute from the start of the application of voltage of 19.9 mA/cm$^2$. The mold was manufactured in the same manner as in Example 1 except that the other conditions for anodization in the process (a) were changed to those described in Table 1, and a molded article was then manufactured using the mold thus obtained.

The conditions for anodization in the process (a), the result of the evaluation on the appearance of the aluminum substrate surface after the termination of process (a), and the measured result of the haze of the molded article are presented in Table 1.

Example 5

The current limiting was carried out so as to have the current density for 1 minute from the start of the application of voltage of 19.9 mA/cm$^2$. The mold was manufactured in the same manner as in Example 1 except that the other conditions for anodization in the process (a) were changed to those described in Table 1, and a molded article was then manufactured using the mold thus obtained.

The conditions for anodization in the process (a), the result of the evaluation on the appearance of the aluminum substrate surface after the termination of process (a), and the measured result of the haze of the molded article are presented in Table 1.

Example 6

The current limiting was carried out so as to have the current density for 1 minute from the start of the application of voltage of 19.9 mA/cm$^2$. The mold was manufactured in the same manner as in Example 1 except that the other conditions for anodization in the process (a) were changed to those described in Table 1, and a molded article was then manufactured using the mold thus obtained.

The conditions for anodization in the process (a), the result of the evaluation on the appearance of the aluminum substrate surface after the termination of process (a), and the measured result of the haze of the molded article are presented in Table 1.

Reference Example

The current limiting was carried out so as to have the current density for 1 minute from the start of the application of voltage of 8 mA/cm$^2$. The mold was manufactured in the same manner as in Example 1 except that the other conditions for anodization in the process (a) were changed to those described in Table 1, and a molded article was then manufactured using the mold thus obtained.

The conditions for anodization in the process (a) and the result of the evaluation on the appearance of the aluminum substrate surface after the termination of process (a) are presented in Table 1.

Comparative Example 1

The massive aluminum having a purity of 99.97% by mass was cut into a roll shape having a diameter of 200 mm and a width of 320 mm, its surface was subjected to the cutting to have a mirror finished surface, and this was used as the aluminum substrate.

The mold was manufactured in the same manner as in Example 1 except that this aluminum substrate was used, a voltage of 80 V was applied without carrying out the current limiting in the process (a), and the anodization was performed for 5 minutes to form an oxide film having pores, and a molded article was then manufactured using the mold thus obtained.

The conditions for anodization in the process (a), the result of the evaluation on the appearance of the aluminum substrate surface after the termination of process (a), and the measured result of the haze of the molded article are presented in Table 1. In addition, the change in current during the time until 5 minutes elapses from the start of the application of voltage in the process (a) is illustrated in FIG. 5.

of an antireflection product, an antifogging product, an antifouling product, and a water repellent product.

In addition, the molded article obtained by the method of manufacturing a molded article having a fine relief structure on the surface of the invention is suitable as an antireflection product, an antifogging product, an antifouling product, and a water repellent product.

TABLE 1

| | | | Condition for anodization in process (a) | | | | | | | | | | Evaluation | |
|---|---|---|---|---|---|---|---|---|---|---|---|---|---|---|
| | Material of substrate | Electrolytic solution | Time at each voltage [min] | | | | | | | Current limiting Current [A] | Current density [mA/cm²] | Time required to reach final voltage [sec] | | |
| | | | 20 V | 30 V | 40 V | 50 V | 60 V | 70 V | 80 V | | | | $V_2/t_2$ | Appearance | Haze [%] |
| Example 1 | Al(3N7) | Oxalic acid | — | — | 43 | → | → | → | 2 | 5 | 2.5 | 2738 | 0.029 | ○ | 0.7 |
| Example 2 | Al(3N7) | Oxalic acid/ Phosphoric acid | — | — | 95 | → | → | → | 4 | 5 | 2.5 | 5814 | 0.014 | ○ | 0.69 |
| Example 3 | Al(4N6) + Mg(1%) | Oxalic acid | — | — | 30 | → | → | → | 4.5 | 5 | 2.5 | 1963 | 0.041 | ○ | 1 |
| Example 4 | Al(4N6) + Mg(1%) | Oxalic acid | — | — | 30 | → | → | → | 4.5 | 40 | 19.9 | 1914 | 0.042 | △ | 1.76 |
| Example 5 | Al(3N7) | Oxalic acid | — | — | 5 | 2 | 2 | 2 | 4 | 40 | 19.9 | 913 | 0.088 | ○ | 1.03 |
| Example 6 | Al(3N7) | Oxalic acid | 15 | 2 | 2 | 2 | 2 | 2 | 4 | 40 | 19.9 | 1849 | 0.043 | ○ | 0.67 |
| Example 7 | Al(3N7) | Oxalic acid | — | — | — | — | — | — | 5 | 16 | 8 | 41 | 1.951 | △ | — |
| Comparative Example 1 | Al(3N7) | Oxalic acid | — | — | — | — | — | — | 5 | 50 | 25 | 5 | 16 | X | 5.13 |

As can be apparently seen from Table 1 and FIG. 5, it was possible to suppress a jump in current immediately after the application of voltage in the case of Example 1 in which $V_a/t_a$ was more than 0.010 and less than 14 in the process (a) where $V_a$ [V] denotes the final voltage and $t_a$ [sec] denotes the time required to reach the final voltage. Moreover, the surrounding scene was mirrored on the aluminum substrate surface after the termination of process (a) in each Example, and the cloudiness was suppressed as well. In addition, the result of visual observation of the appearance of the mold obtained in each Example showed that the cloudiness of surface was suppressed. Furthermore, it was possible to manufacture a molded article (film) having a low haze from the mold obtained in each Example.

In addition, it was possible to manufacture a mold having a relatively great interval between pores by performing the anodization finally at 60 V or more (by setting the final voltage to 60 V or more).

The aluminum substrate surface after the termination of process (a) was not lustrous and thus the surrounding scene was not mirrored in the case of Comparative Example 1 in which $V_a/t_a$ was 14 or more in the process (a). In addition, the result of visual observation of the appearance of the mold obtained in Comparative Example 1 showed that the surface was clouded. Furthermore, the haze of the molded article (film) manufactured using the mold obtained in Comparative Example 1 was significantly higher as compared to the haze of the molded article obtained in each Example.

INDUSTRIAL APPLICABILITY

The mold obtained by the method of manufacturing a mold of the invention is useful for efficient mass production

EXPLANATIONS OF LETTERS OR NUMERALS 10 aluminum substrate
12 pore
14 oxide film
16 hollow
18 mold
20 roll-shaped mold
40 molded article
42 film
44 cured resin layer
46 protrusion

The invention claimed is:
1. A method of manufacturing a mold having an oxide film with a plurality of pores formed on a surface of an aluminum substrate, the method comprising:
(a) a process of applying a voltage to a machined aluminum substrate and anodizing a surface of the aluminum substrate to form an oxide film; and
(b) a process of removing at least a part of the oxide film formed in the process (a), wherein a voltage ($V_a$ [V]) immediately before the process (a) is terminated and a time ($t_a$ [sec]) required to reach the voltage ($V_a$ [V]) after starting the application of voltage satisfy the following Equation (i) in the process (a):

$$0.01 < V_a/t_a < 0.088 \tag{i}$$

wherein (a) comprises conducting an initial anodization at a voltage; and conducting a final anodization at a final voltage that is higher than the voltage in the initial anodization in (a) such that the final voltage applied in (a) is 60 V or more; and wherein in (a) a current density immediately after the application of voltage is 20 mA/cm² or less.

2. The method of manufacturing a mold according to claim 1, wherein a current density immediately after the application of voltage is 10 mA/cm$^2$ or less in the process (a).

3. The method of manufacturing a mold according to claim 1, wherein an electrolytic solution used in the anodization of the process (a) contains an organic acid.

4. The method of manufacturing a mold according to claim 3, wherein a main component of the electrolytic solution is oxalic acid.

5. The method of manufacturing a mold according to claim 1, wherein (a) comprises conducting the initial anodization at 50 V or less.

6. The method of manufacturing a mold according to claim 5, wherein in (a) the voltage is raised in a stepwise manner from the initial anodization voltage to the final voltage in the final anodization.

7. The method of manufacturing a mold according to claim 5, wherein an electrolytic solution used in the anodization of the process (a) contains an organic acid.

8. The method of manufacturing a mold according to claim 7, wherein a main component of the electrolytic solution is oxalic acid.

9. The method of manufacturing a mold according to claim 1, wherein the method further comprises:
(c) a process of anodizing the aluminum substrate to form an oxide film with a plurality of pores after the process (b) or the following process (d);
(d) a process of removing a part of the oxide film formed in the process (c); and
(e) a process of alternately repeating the process (c) and the process (d), wherein
a voltage ($V_c$ [V]) immediately before the process (c) is terminated and a time ($t_c$ [sec]) required to reach the voltage ($V_c$ [V]) after applying a voltage satisfy the following Equation (ii) in the process (c):

$$2 < V_c/t_c < 14 \qquad (ii).$$

10. The method of manufacturing a mold according to claim 9, wherein a current density immediately after the application of voltage is 20 mA/cm$^2$ or less in the process (c).

11. The method of manufacturing a mold according to claim 10, wherein a current density immediately after the application of voltage is 10 mA/cm$^2$ or less in the process (c).

12. The method of manufacturing a mold according to claim 9, wherein (a) comprises conducting an initial anodization at 40 V or less; and an electrolytic solution used in the anodizing in (c) contains an organic acid.

13. The method of manufacturing a mold according to claim 12, wherein a main component of the electrolytic solution used in the anodization of the process (c) is oxalic acid.

14. A method for suppressing cloudiness of a mold surface in the manufacture of a mold having a fine relief surface composed of an oxide film with a plurality of pores that is formed on a surface of an aluminum substrate, the method comprising:
(a) a process of applying a voltage to a machined aluminum substrate and anodizing a surface of the aluminum substrate to form an oxide film,
wherein (a) comprises the steps of
(1) conducting an initial anodization at 50 V or less; and
(2) conducting a final anodization at a final voltage that is higher voltage than the voltage in the initial anodization in (a)(1),
in which the voltage is raised in a stepwise manner from the voltage in the initial anodization in (a)(1) to the final voltage in (a)(2),
provided a voltage ($V_a$ [V]) immediately before the process (a) is terminated and a time ($t_a$ [sec]) required to reach the voltage ($V_a$ [V]) after starting the application of voltage satisfy the following Equation (i) in the process (a)

$$0.010 < V_a/t_a < 0.088 \qquad (i),$$

provided in (a) a current density immediately after the application of voltage is 20 mA/cm$^2$ or less while avoiding a jump in current and in voltage immediately after the voltage is applied, and
step (a) is conducted using an electrolytic solution comprising oxalic as a main acid at an oxalic acid concentration of 0.7M or less, and the electrolytic solution has a temperature of 60° C. or less; and
(b) a process of removing at least a part of the oxide film formed in the process (a),
whereby the mold having a fine relief on the mold surface with an oxide film having a plurality of pores formed on the mold surface and having suppressed cloudiness of the mold surface is obtained.

* * * * *